(12) United States Patent
Biehler et al.

(10) Patent No.: US 7,991,936 B1
(45) Date of Patent: Aug. 2, 2011

(54) COMMUNICATION SUBSCRIBER OR COMMUNICATION METHOD FOR COMMUNICATION WITH A FIELD BUS AND A NETWORK

(75) Inventors: Georg Biehler, Nuremberg (DE); Hubert Gehring, Nuremberg (DE); Ronald Lange, Fürth (DE); Reiner Plaum, Erlangen (DE); Thomas Talanis, Heroldsbach (DE)

(73) Assignee: Siemens Aktiengesellschaft, Munich (DE)

( * ) Notice: Subject to any disclaimer, the term of this patent is extended or adjusted under 35 U.S.C. 154(b) by 1954 days.

(21) Appl. No.: 10/130,228

(22) PCT Filed: Nov. 16, 2000

(86) PCT No.: PCT/DE00/04057
§ 371 (c)(1),
(2), (4) Date: May 15, 2002

(87) PCT Pub. No.: WO01/37492
PCT Pub. Date: May 25, 2001

(30) Foreign Application Priority Data

Nov. 17, 1999 (DE) .................................. 199 55 306

(51) Int. Cl.
*G06F 13/14* (2006.01)
*G06F 15/16* (2006.01)

(52) U.S. Cl. ...................................... 710/305; 709/203
(58) Field of Classification Search .................. 710/305; 709/203
See application file for complete search history.

(56) References Cited

U.S. PATENT DOCUMENTS

| | | | | | |
|---|---|---|---|---|---|
| 5,978,850 | A | * | 11/1999 | Ramachandran et al. | 709/228 |
| H1897 | H | * | 10/2000 | Fletcher et al. | 28/134 |
| H1921 | H | * | 11/2000 | Fletcher et al. | 105/37 |
| 6,374,294 | B1 | * | 4/2002 | Quirt | 709/221 |
| 6,529,500 | B1 | * | 3/2003 | Pandharipande | 370/352 |
| 6,684,073 | B1 | * | 1/2004 | Joss et al. | 455/433 |
| 7,146,408 | B1 | * | 12/2006 | Crater et al. | 709/219 |
| 2003/0004987 | A1 | * | 1/2003 | Glanzer et al. | 707/500 |

OTHER PUBLICATIONS

Kastner W, Csebits C, Mayer M; "Linux in Factory Automation? Internet Controlling of Fieldbus Systems!"; 1999 7th IEEE Conference on Emerging Technologies and Factory Automation; Proceedings ETFA '99, vol. 1, Oct. 18-21, 1999; pp. 27-31, XP000985987.*

* cited by examiner

*Primary Examiner* — Brian T Misiura
*Assistant Examiner* — Nimesh G Patel
(74) *Attorney, Agent, or Firm* — King & Spalding L.L.P.

(57) ABSTRACT

A communications subscriber (P) which is suitable as an interface between a network (N) and a field bus (BU) and has software objects (A', B') for representing appliances (A, B) which can be connected via the field bus, which software objects can be addressed, like the appliances (A, B) themselves, via the network (N), so that appliances having only field bus access can also be transparently incorporated into "high performance" networks.

10 Claims, 3 Drawing Sheets

COMMUNICATION SUBSCRIBER OR COMMUNICATION METHOD FOR COMMUNICATION WITH A FIELD BUS AND A NETWORK

CROSS-REFERENCE TO RELATED APPLICATIONS

This is a national application for International Application No. PCT/DE00/04057 which was filed on Nov. 16, 2000 and which published in German on May 25, 2001, which in turn claims priority from 199 55 306.8, which was filed on Nov. 17, 1999.

FIELD OF THE INVENTION

The present invention relates to a method of communication for a communications subscriber.

SUMMARY OF THE INVENTION

The object of the present invention is to allow a first communications subscriber, connected to a first network, to be able to interchange data conveniently with a second communications subscriber, to which a second network not directly connected to the first network can be connected.

To this end, a special hereinafter additional communications subscriber is first provided which is connected to the first network hereinafter "network," and which also has the second network "field bus" connected to it. The additional communications subscriber is thus used as an interface between the network and the field bus.

This method provides a particularly convenient way of interchanging data is by virtue of the special communications subscriber connected to the network having software objects for representing terminals (the potential second communications subscribers) which can be connected to the field bus. The field bus synchronizes an address space which is shared at least by the terminals and the special communications subscriber, and can be mapped at least in a memory provided for this purpose in the special communications subscriber. The special communications subscriber's software objects can be addressed via the network, using a transfer protocol defined for the network, in exactly the same way as the special communications subscriber itself or other communications subscribers. In the case of a message arriving on the special communications subscriber via the network, the addressed software object representing a terminal as a second communications subscriber handles the steps required in line with the transfer protocol defined for the network in order to receive the message. In addition, either a data item is impressed into the special communications subscriber's aforementioned memory in response to the message, in which case the change to the content of the memory can be transmitted to the second communications subscriber via the field bus during the cyclic data transfer, or the message is transmitted, particularly after it has been transformed into a form suitable for the transfer protocol of the field bus, to the second communications subscriber represented by the software object.

The number of software objects on the special communications subscriber is preferably adjusted in a freely definable manner, but particularly to suit the number of terminals connected to the field bus.

It is further preferred if the respective software objects can be assigned unique addresses within the network which are suitable for targeted data transfer in line with the transfer protocol provided for the network. The addressed software object carries out preprocessing for the data in the received message, preferably according to the type of data transmitted with the message.

BRIEF DESCRIPTION OF THE DRAWINGS

Various features, advantages and opportunities for application of the present invention are disclosed below in the context of an exemplary embodiment and related drawing in which.

DETAILED DESCRIPTION OF THE INVENTION

The special communications subscriber P is an interface between the network N and the field bus BU. Terminals A, B are connected to the communications subscriber P via the field bus BU, the terminals performing very varied technological functions (actuators, sensors, etc.) necessary for automating technical processes.

Figure 1:
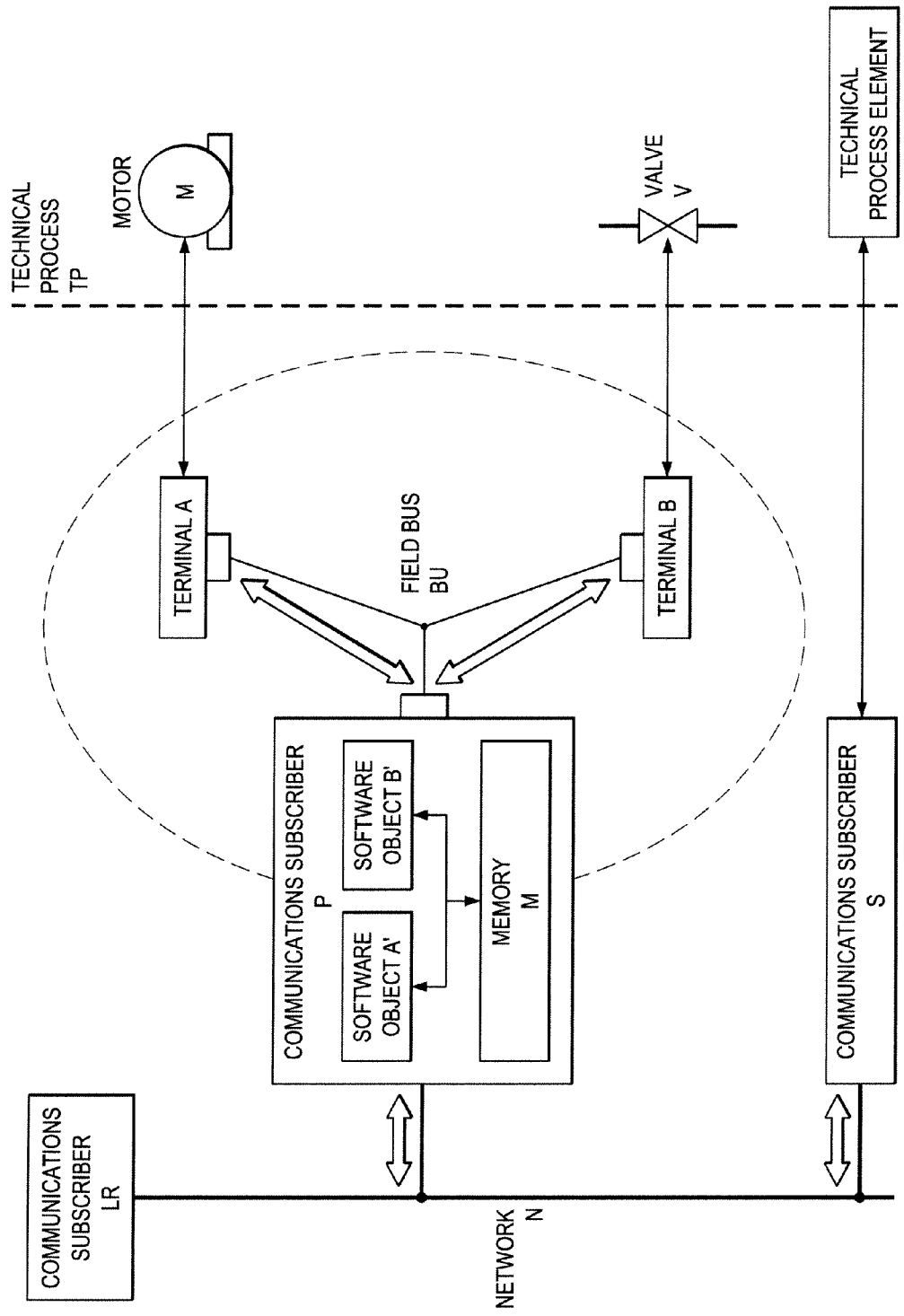
FIG. 1 illustrates a plurality of communications subscribers LR, P, S which are connected to the network N, with one communications subscriber LR being a control computer, for example.

Hereinbelow, it is assumed that a motor M is connected to the terminal A, and a valve V is connected to the terminal B. The motor M and the valve V are elements of a technical process TP which is to be controlled and is indicated only schematically in FIG. 1 by the dividing line.

To communicate with the terminals A, B, the communications subscriber P contains software objects A', B' which, from the point of view of the network, represent the terminals A, B which cannot be reached directly via the network.

In a preferred embodiment, in order to be able to include the specific functionality of the respective terminals A, B, an object type A" which geared to the motor functionality of the terminal A is instantiated as software object A', and an object type B" which geared to the valve functionality of the terminal B is instantiated as software object B'. The respective object types A", B" provide a collection of input data, output data, and methods (element functions, properties) M11, M12, M13, M14, V11, V12 which is geared to the respective functionality to be implemented, and can be used to access particular functionalities of the terminals or of the object classes representing said terminals. See FIGS. 2 and 3. To turn off the motor M connected to the terminal A, for example, the control computer LR transmits a message addressing the corresponding element function of the software object A' to the software object A' via the network N. The corresponding element function may be "motor off", for example. The procedure is similar for the valve functionality of the terminal B.

Figure 2:
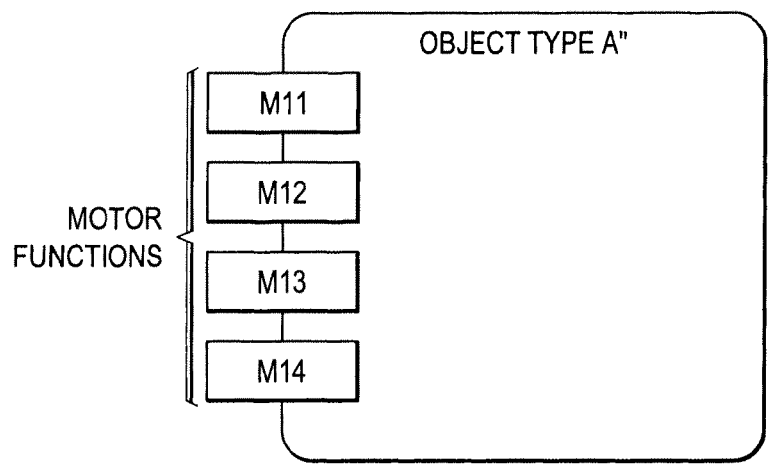
FIGS. 2 and 3 graphically illustrate the object types instantiated as software objects A', B' with the communications subscriber B.
Figure 3:
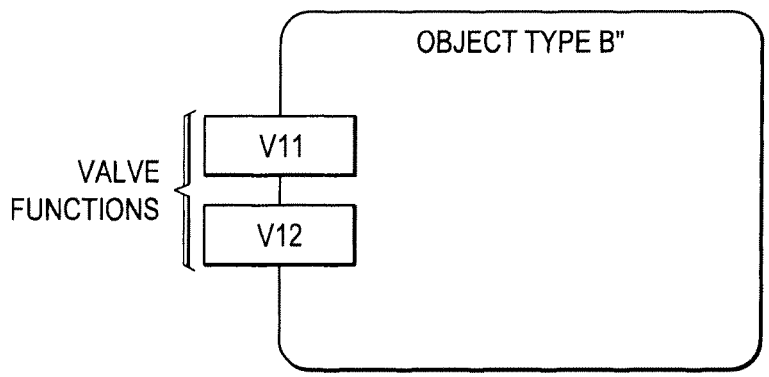

Accordingly, FIGS. 2 and 3 show a graphical illustration of the object types instantiated as software objects A', B' in the communications subscriber B in order to represent a terminal A with a motor M connected thereto or in order to represent a terminal B with a valve V connected thereto. In FIG. 2, the object type A" has four exported data items or element functions M11, M12, M13, M14. Suitable exported data M11, M12, for example, are the rated and actual rotation speeds of the motor M; suitable exported element functions M13, M14, for example, are functions for turning the motor on and off. Naturally, other exported data and element functions can also be envisaged, for example element functions for starting up the motor in line with a prescribable or prescribed characteristic curve, data for stipulating the braking response, etc.

FIG. 3 shows the object type B", provided for representing the terminal B with the valve V connected thereto, having two exported data items or element functions V11, V12, the element functions V11, V12, for example, provide functions for opening and closing the valve.

The respective software objects A', B' contain program code which is suitable either for transferring transferred data directly into the shared memory space M of the field bus BU or else for sending messages which are used to transmit the appropriate data directly to the terminals A, B. When the data are entered into the shared memory space M, altered data are transmitted to the terminals A, B via the field bus BU during the cyclic transfer, so that even a data item which is initially changed only in the memory space M finally arrives on the actual addressee, e.g. the terminal A. When sending messages for data transfer via the field bus BU, the software object A', B' undertakes transformation of the message received via the network N into the data format provided for the field bus BU. In the case of the "Profibus" BU, a widespread field bus BU, such messages would be sent as "acyclic" messages, which do not affect the cyclic data interchange.

Figure 4:
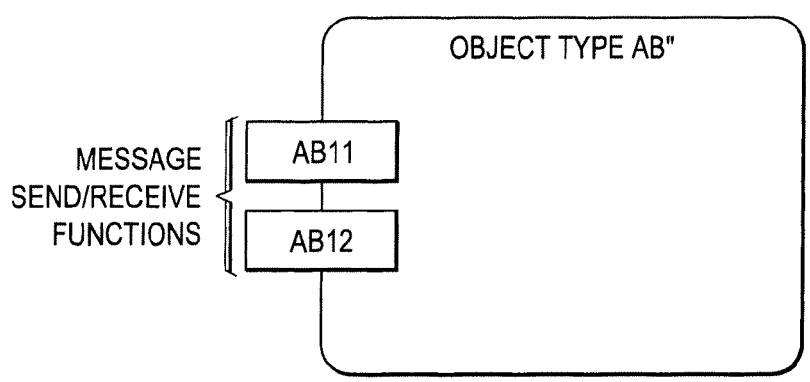
FIG. 4 is an embodiment of the present invention wherein the software objects have the same object type "AB"

Unlike the example described above, in which the software objects A', B' were instances of respectively different object types A", B", it is conceivable that the software objects A', B' to be instances of one and the same object type AB", with the object type AB" then at least providing methods AB11, AB12 for sending and receiving messages via the network N, See. FIG. 4. In this case, to turn on the motor M which is connected to the terminal A, a message is sent from the control computer LR to the software object A', and hence the element function "receive" AB11 associated with the instance of the corresponding object type AB" is activated. The element function "receive" AB11 uses codes provided in the software object A' to ensure that the message received via network N is transformed into a form suitable for the field bus BU and is finally transmitted to the terminal A.

Figure 5:
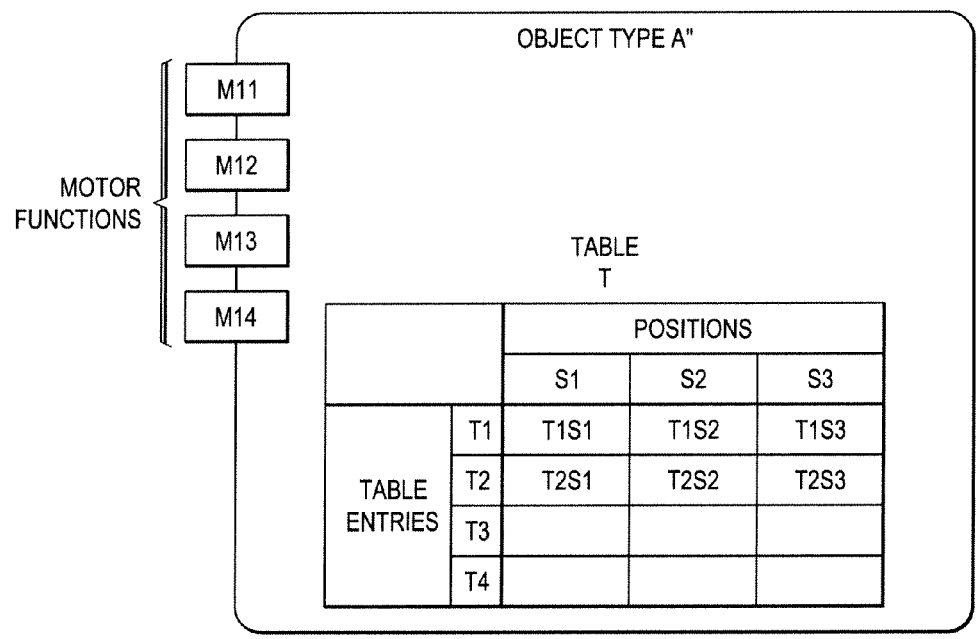
FIG. 5 is an embodiment of the present invention wherein one and the same software objects represent different interface functionalities of the terminals A, B to be addressed.

In another embodiment of the present invention illustrated in FIG. 5, it is possible for instances of one and the same software object also to be used to represent different interface functionalities of the particular terminals A, B to be addressed. To this end, the software object has a table T provided in it, with the individual table entries T1, T2 comprising at least two positions S1, S2. The first position T1S1 for a table entry T1, T2 represents an address for the shared address space of the communications subscribers P, A, B connected to the field bus BU, and the second position T1S2 represents the memory requirement for the data item at the specified address.

By way of example, if the rotation speed of the motor M connected to the terminal A needs to be altered, the rated rotation speed stored at a defined position, e.g. at the address #768, in the shared memory space M can be modified by a corresponding instruction based on an associated communication. To this end, the new rated value transmitted with the message is entered at an address indicated in the first position T1S1 in the table, for example, in this case #768. The data change in the shared memory M is communicated to the terminal A via the field bus BU during the cyclic data transfer.

To increase user-friendliness even further, the individual entries T1, T2 are extended by an additional position S3. This position S3 comprises a structure which at least provides space for declaring a name for the corresponding position in the table T. Thus, by way of example, a first position T1 in the table T can be called "rated value" T1S3, and another position T2 in the table T can be called "actual value" T2S3. These names are exported, specifically (for example) by virtue of "type libraries", which largely correspond to the "header files" known from the programming language C++, for example, which contain the names and the associated data, being available on all the communications subscribers globally for a project.

Once the names "rated value" T1S3, and "actual value" T2S3 are thus available in the control computer LR, for example, it is a particularly simple matter to address the motor connected to the terminal A by using the protocol for the network N to request the exported data item Actual Value from the software object A' in order to request the actual value. Internally, when the data item Actual Value is requested via the link using the table T, the data item entered in the row T1 represented by the declaration Actual Value is read out using the associated address T1S1. In this case, it is possible to read from the global memory area M again. The actual value in the memory area M is always up to date on account of the cyclic data interchange via the field bus FB.

Figure 6:
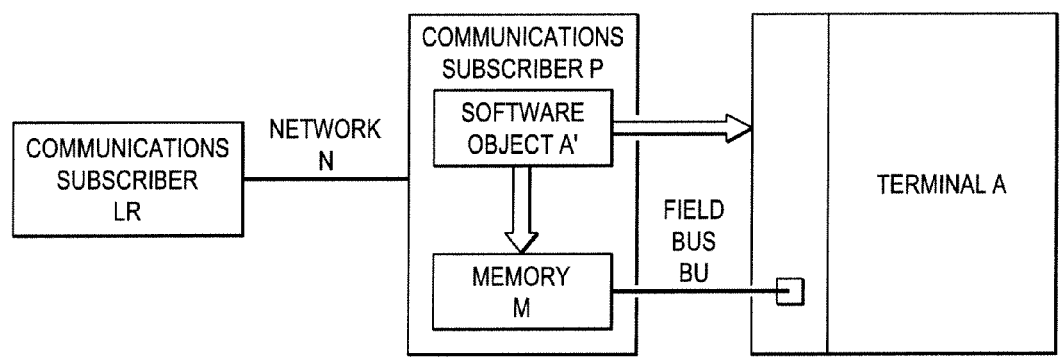
FIG. 6 is a further embodiment of the present invention using "PROFIBUS DP" as field bus BU, with a DP master P and one or more DP slaves A.

A further exemplary embodiment is described below with reference to FIG. 6. A possible implementation of this configuration uses, as field bus BU, the "PROFIBUS DP" with a DP master P and one or more DP slaves A. The control computer LR initiates a communication via the object bus DCOM using TCP/IP and Ethernet N to the DP master P, and addresses the software object A'. The software object A' uses data stored in a definition table to ascertain the transfer path which can be used to best effect for the PROFIBUS DP BU. In this context, the definition table contains, for each of the functions defined on the DCOM interface of the software object A', the access path and the access parameters required for access.

If the function called is a "DCOM property access operation" to a locally available data item, the software object A' uses the shared memory M. This applies specifically when the DCOM property is mapped onto an I/O signal from the DP slave A. The I/O signals from DP slaves are transported cyclically into the shared memory M on the DP master P, in line with the DP standard. This function can thus be executed completely on the DP master; no communication with this DP slave A is necessary. The bus BU is relieved of load by the communication for access to these data.

If a function which can be executed only by the DP slave is involved, i.e. property access operations to data which are not contained in the I/O signals, or calls to methods, the DCOM protocol is converted into a real-time protocol tuned specifically to the PROFIBUS DP (a "short form" of the DCOM PDU, in order to minimize the data transferred). This real-time protocol uses the PROFIBUS DPV1 mechanism "Write data records" in order to transfer the protocol units to the DP slave A. The latter receives the protocol and implements the respective function in response to the received message. Following processing, the response parameters are transported in the reverse direction from the DP slave A to the DP master P using the real-time protocol and using the PROFIBUS DPV1 mechanisms "Alarm" in combination with "Read data record", and from the DP master P are transported to the software object A'. The software object A' returns the response parameters to the caller LR via the bus N and using the communication mechanisms (DCOM) used.

We claim:

1. A communications subscriber interface between a network and a field bus, comprising:
the communications subscriber connected to the network, and
the field bus connected to the communications subscriber,
said communications subscriber having terminal-specific software objects representing, from the point of view of the network, terminals connected to the field bus as an instance of an object type, which terminals cannot be reached directly via the network, and which terminal-specific software objects provide a collection of input and/or output data and/or methods which is geared to the respective functionalities of the terminals and can be used to access these functionalities,
wherein the software objects can be addressed via the network using a transfer protocol defined for the network, in exactly the same way as the communications subscriber itself or other communications subscribers, and
wherein the field bus synchronizes an address space which is shared by the communications subscriber and the terminals and can be mapped at least in a shared memory of the communications subscriber, and
wherein a particular software object representing a particular terminal includes a table that specifies data access paths corresponding to different functions associated with the particular terminal, including:
at least one first table entry for a first function associated with the particular terminal, the at least one first table entry specifying an access path to the particular terminal via the field bus, such that upon receiving a request for the first function at the communications subscriber via the network, the particular software object executes the first function by communicating with the particular terminal via the field bus; and
at least one second table entry for a second function associated with data communicated from the particular terminal to the shared memory and maintained in the shared memory, the at least one second table entry specifying an access path to the shared memory and within the communications subscriber, such that upon receiving a request for the second function at the communications subscriber via the network, the particular software object executes the second function by communicating with the shared memory and without communicating with the particular terminal, such that the field bus is relieved of load.

2. The communications subscriber according to claim 1, wherein the number of software objects is adjusted in a freely definable manner, so as to suit the number of terminals connected to the field bus.

3. The communications subscriber accordingly to claim 1, wherein the software objects can be assigned unique addresses within the network which are suitable for targeted data transfer in line with the transfer protocol provided for the network.

4. The communications subscriber according to claim 3, wherein the addressed software object carries out preprocessing for the data in a received message.

5. The communications subscriber according to claim 1, further comprising a software object having a table containing at least one table element, where the table element can store at least one address and a dimension information item for a data item, the address being the address of an input or output value exported by the terminal and relating to a shared address space in the field bus, and the dimension information item being a memory space requirement for the input or output value in the address space.

6. A method of communication for communication between a control computer (LR) and at least one terminal (A, B), the method comprising:
connecting the control computer to a network (N);
connecting the at least one terminal to a communication subscriber (P) via a field bus, which communication subscriber synchronizes an address space shared by the communications subscriber and at least one terminal and can be mapped at least in a shared memory of the communications subscriber and which is suitable as an interface to the communications subscriber;
connecting the communications subscriber to the network, said communication subscriber having at least one terminal-specific software object for representing, from the point of view of the network, the at least one terminal as an instance of an object type, which terminal cannot be reached directly via the network, and wherein the at least one terminal-specific software object provides a collection of input and/or output data and/or methods which is geared to the respective functionalities of the at least one terminal and can be used to access these functionalities; and
addressing the software object via the network using a transfer protocol defined for the network in exactly the same way as the communications subscriber itself or other communications subscribers, and
receiving at the communications subscriber via the network a request for a particular function associated with the particular terminal represented by a particular software object,
accessing a table at the particular software object;
determining, based on the table, a data access path specified for the particular function, the table including:
at least one first table entry for a first type of function associated with the particular terminal, the at least one first table entry specifying an access path to the particular terminal via the field bus, such that if the received particular function is the first type of function, the particular software object executes the particular function by communicating with the particular terminal via the field bus; and
at least one second table entry for a second type of function associated with data communicated from the particular terminal to the shared memory and maintained in the shared memory, the at least one second table entry specifying an access path to the shared memory and within the communications subscriber, such that if the received particular function is the second type of function, the particular software object executes the particular function by communicating with the shared memory and without communicating with the particular terminal, such that the field bus is relieved of load.

7. The method of communication according to claim 6, wherein the number of software objects is adjusted in a freely definable manner so as to suit the number of terminals connected to a subnetwork.

8. The method of communication according to claim 6, wherein the software objects can be assigned unique addresses within the field bus which are suitable for targeted data transfer in line with the transfer protocol provided for the field bus.

9. The method of communication according to claim 6, wherein the addressed software objects representing the second communications subscriber carries out preprocessing for the data in the received message.

10. The method of communication according to claim 6, where the software objects have a table containing at least one table element, where the table element can store at least one address and a dimension information item for a data item, the address being the address of an input or output value exported by the terminal relating to the shared address space of the field bus, and the dimension information item being the memory space requirement for this input or output value in the address space.

* * * * *